(12) United States Patent
Uyttendaele et al.

(10) Patent No.: US 7,239,805 B2
(45) Date of Patent: Jul. 3, 2007

(54) METHOD AND SYSTEM FOR COMBINING MULTIPLE EXPOSURE IMAGES HAVING SCENE AND CAMERA MOTION

(75) Inventors: Matthew T. Uyttendaele, Seattle, WA (US); Richard S. Szeliski, Bellevue, WA (US); Ashley Michelle Eden, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 258 days.

(21) Appl. No.: 11/049,597

(22) Filed: Feb. 1, 2005

(65) Prior Publication Data

US 2006/0177150 A1   Aug. 10, 2006

(51) Int. Cl.
*G03B 7/00* (2006.01)
*G03B 41/00* (2006.01)
*G06K 9/32* (2006.01)
(52) U.S. Cl. ............... 396/222; 396/322; 348/36; 348/218.1; 348/362; 382/284; 382/294
(58) Field of Classification Search ............... 396/20, 396/213, 222, 322; 348/36, 218.1, 239, 362; 348/584; 345/629; 382/284, 294
See application file for complete search history.

(56) References Cited

U.S. PATENT DOCUMENTS 5,818,977 A * 10/1998 Tansley ............... 382/294
7,010,158 B2 * 3/2006 Cahill et al. ............... 382/154
7,126,630 B1 * 10/2006 Lee et al. ............... 348/218.1
2005/0168623 A1 * 8/2005 Stavely et al. ............... 348/362

OTHER PUBLICATIONS

Co-pending U.S. Appl. No. 10/623,033, Kang, S.B., Uyttendaele, M., Winder, S., and Szeliski, R., "System and Method for generating high dynamic range images from multiple exposures of a moving scene", filed Jul. 18, 2003.
Agarwala, A., Dontcheva, M., Agrawala, M., Drucker, S., Colburn, A., Cureless, B., Salesin, D., and Cohen, M., "Interactive digital photomontage" in *ACM Trans. Graph.*, 23(3):294-302, 2004.
Boykov, Y., Veksler, O., and Zabih, R., "Fast approximate energy minimization via graph cuts" in *IEEE Trans. Pattern Anal. Mach. Intell.*, 23(11):1222-1239, 2001.

(Continued)

*Primary Examiner*—W. B. Perkey
(74) *Attorney, Agent, or Firm*—Lyon & Harr, L.L.P.; Craig S. Fischer

(57) ABSTRACT

A panoramic high-dynamic range (HDR) image method and system of combining multiple images having different exposures and at least partial spatial overlap wherein each of the images may have scene motion, camera motion, or both. The major part of the panoramic HDR image method and system is a two-pass optimization-based approach that first defines the position of the objects in a scene and then fills in the dynamic range when possible and consistent. Data costs are created to encourage radiance values that are both consistent with object placement (defined by the first pass) and of a higher signal-to-noise ratio. Seam costs are used to ensure that transitions occur in regions of consistent radiances. The result is a high-quality panoramic HDR image having the full available spatial extent of the scene along with the full available exposure range.

20 Claims, 13 Drawing Sheets

OTHER PUBLICATIONS

Brown, M., and Lowe, D.G., "Recognising panoramas" in *Proceedings of the Ninth IEEE International Con-ference on Computer Vision*, pp. 1218-1225. IEEE Computer Society, 2003.

Davis, J., "Mosaics of scenes with moving objects" in *Proceedings of the IEEE Computer Society Conference on Computer Vision and Pattern Recognition*, pp. 354-360, 1998.

Debevec, P.E., and Malik, J., "Recovering high dynamic range radiance maps from photographs" in *Computer Graphics*, 31 (Annual Conference Series):369-378, 1997.

Durand, F., and Dorsey, J., "Fast bilateral filtering for the display of high-dynamic-range images" in *ACM Transactionson Graphics (TOG)*, 21(3):257-266, 2002.

Fattal, R., Lischinski, D., and Werman, M., "Gradient domain high dynamic range compression" in *ACM Transactions on Graphics (TOG)*, 21(3):249-256, 2002.

Kang, S.B., Uyttendaele, M., Winder, S., and Szeliski, R., "High dynamic range video" in *ACM Trans. Graph.*, 22(3):319-325, 2003.

Kolmogorov, V., and Zabih, R., "What energy functions can be minimized via graph cuts?" in *IEEE Trans. Pattern Anal. Mach. Intell.*, 26(2):147-159, 2004.

Levin, A., Zomet, A., Peleg, S., and Weiss, Y., "Seamless image stitching in the gradient domain" in *Eighth European Conference on Computer Vision (ECCV 2004)*, vol. IV, pp. 377-389, Prague, May 2004. Springer-Verlag.

Mann, S., and Picard, R., "Being 'undigital' with digital camera: Extending dynamic range by combining differently exposed pictures" in *Proceedings of IS & T 46th annual conference*, pp. 422-428, 1995.

Mitsunaga, T., and Nayar, S.K., "Radiometric self calibration" in *Proceedings of the IEEE Computer Society Conference on Computer Vision and Pattern Recognition*, vol. 2, pp. 374-380, Jun. 1999.

Pal, C., Szeliski, R., Uyttendaele, M., and Jojic, N., "Probability models for high dynamic range imaging" in *Proceedings of the IEEE Computer Society Conference on Computer Vision and Pattern Recognition*, vol. 2, pp. 173-180, 2004.

Perez, P., Gangnet, N., and Blake, A., "Poisson image editing" in *ACM Transactions on Graphics*, 22(3):313-318, Jul. 2003.

Reinhard, E., et al., "Photographic tone reproduction for digital images" in *ACM Transactions on Graphics (TOG)*, 21(3):267-276, 2002.

Tsin, Y., Ramesh, V., and Kanade, T., "Statistical calibration of the CCD imaging process" in *IEEE International Conference on Computer Vision*, pp. 480-487, Jul. 2001.

Uyttendaele, M., Eden, A., and Szeliski, R., "Eliminating ghosting and exposure artifacts in image mosaics" in *Proceedings of the IEEE Computer Society Conference on Computer Vision and Pattern Recognition*, vol. 2, pp. 509-516, Dec. 2001.

* cited by examiner

METHOD AND SYSTEM FOR COMBINING MULTIPLE EXPOSURE IMAGES HAVING SCENE AND CAMERA MOTION

TECHNICAL FIELD

The present invention relates in general to the processing of digital image data and more particularly to panoramic high dynamic range (HDR) method and system of combining multiple images having different exposures wherein each of the images may have scene motion, camera motion, or both.

BACKGROUND OF THE INVENTION

Many current digital cameras generally are incapable of capturing all spatial directions and all intensities of a given scene. These digital cameras cannot capture a scene such that the image reflects the full dynamic and angular extent that the photographer intended. All digital cameras have a limited field-of-view such that all directions of the scene cannot be captured. This requires a photographer to either pan around the scene taking overlapping images to capture the entire scene or select which sub-part of the scene to capture. In addition, the digital cameras cannot simultaneously capture all intensities of a scene due to the fact that the real world has a much wider range of intensities than is discernable from a single camera exposure. These real world intensities range from starlight intensity to sunlight intensity. The dynamic range of light in a scene from shadows to bright sunlight can range nearly four orders of magnitude. However, most cameras can capture only two to three orders of magnitude in a single exposure. This means that the photographer or the camera must decide which sub-part of the intensity range to capture.

One solution to this problem was given in U.S. Ser. No. 10/623,033 by Sing Bing Kang, Matthew T. Uyttendaele, Simon Winder, and Richard Szeliski entitled "System and Process for Generating High Dynamic Range Images from Multiple Exposures of a Moving Scene" filed on Jul. 18, 2003. However, this solution has several limitations. One limitation is that the technique was not designed to deal with large amounts of scene motion. Another limitation is that the technique used a per-pixel decision of which image to choose and this led to noisy results. Finally, another limitation is that the technique cannot generate panoramas.

Many other image merging techniques for HDR images assume that the input images are perfectly registered. This allows the output HDR image to be constructed as a straightforward weighted average of the radiance values of the registered inputs. The more principled approaches set the weight proportionally to the signal-to-noise of the pixel. In practice, however, perfect sub-pixel registration is difficult to achieve. This is due to several factors, such as imperfect camera calibration, parallax (especially when the inputs come from a handheld camera), and scene motion.

Some techniques address some of these issues by including per-pixel optical flow as part of the registration process. In addition, some techniques modulate the weighting function by a penalty to down-weight radiance values that were not in agreement with an automatically determined "reference" image. However, optical flow can be brittle in the presence of occlusions and the per-pixel decision built into their penalty function can lead to non-smooth results.

Therefore, what is needed is a panoramic high dynamic range (HDR) method and system of automatically combining multiple input images to create a high dynamic range image having a panoramic view. In addition, what is needed is a panoramic HDR method and system that can automatically combine multiple input images that vary in intensity range, scene orientation, or both, to create a panoramic HDR image. What is also needed is a panoramic HDR method and system that automatically merges input images to generate a final image having an extended intensity range and spatial extent.

SUMMARY OF THE INVENTION

The invention disclosed herein includes a panoramic high-dynamic range (HDR) image method and system for generating a panoramic HDR image having the complete available spatial range and a complete available exposure range. The panoramic HDR image method and system uses a set of input images containing multiple images of a scene. The images of the input image set have different exposures and at least partially overlap in the spatial domain. The panoramic HDR image method and system automatically processes the input image set to create a high-quality seamlessly stitched panoramic HDR image. Thus, the panoramic HDR image method and system automatically stitches multiple images at varying orientations and exposures to create a composite panorama that preserves the angular extent and dynamic range of the input image set.

Because of the angular and dynamic limitations of cameras, the generation of a high-dynamic range panoramic images requires several inputs of varying exposures and spatial orientations. In practice, these inputs are often of a non-static scene, captured with a handheld camera, which often results in scene motion and parallax. These factors, in addition to imperfect camera calibration, make sub-pixel registration nearly impossible.

The panoramic HDR image method and system includes a novel technique for seamless high-dynamic range image stitching assuming large scene motions. The major part of the panoramic HDR image method and system is a two-pass optimization-based approach that first defines the position of the objects in a scene and then fills in the dynamic range when possible and consistent. Data costs are created to encourage radiance values that are both consistent with object placement (defined by the first pass) and of a higher signal-to-noise ratio. Seam costs are used to ensure that transitions occur in regions of consistent radiances.

The panoramic HDR method includes aligning the input image set using a feature-based registration technique that is invariant to exposure differences. The geometrically-aligned input image set then is converted to radiance maps. This radiometric alignment backs out all camera processing to recover the true scene radiance, thus normalizing the pixels. The novel radiometric alignment technique includes taking multiple overlapping images and processes them such that they are all consistently color balanced. In one embodiment of the radiometric alignment technique, a reference image is selected whose color balance is desirable. Next, the gains for each color channel in the reference images are determined. Through an iterative process, each of the remaining images in the input image set are processed to adjust the gain for each color channel such that the gain equals the corresponding gain for that color channel in the reference image. This ensures that all images in the input image set are consistently color balanced. In an alternate embodiment of the radiometric alignment process, there is no reference image and the gains of each of the color channels for each image are adjusted equalize the color balance for each of the images.

In cases where the necessary information is provided by the camera manufacturer the radiometric alignment process is optional.

The panoramic HDR method further includes a two-step image selection process. The first step is to construct a reference panorama from a subset of the input image set. In one embodiment, the reference panorama is constructed using a graph-cut optimization technique. The subset and the reference panorama contain the complete available spatial range of the scene as captured in the input image set. This first step fixes the positions of moving objects in the scene. However, although the reference panorama has the entire available spatial extent of the scene, the full available dynamic range may be lacking. In other words, the reference panorama may contain underexposed or saturated pixels.

The second step of the image selection process is a pixel labeling process. In this second step, the complete available dynamic exposure range as captured by the input image set is used to fill in the reference panorama. Base radiance values in the reference image are replaced wherever an overlapping image's radiance value is consistent and produces a higher quality final composite image. The criteria for what is a "better" pixel is defined by introducing data costs and seam costs. The data costs encourage and reward consistency and higher signal-to-noise ratios (SNR) and the seam costs encourage and reward transitions in regions of strong agreement between images of their radiance values. The seam costs are a way to normalize a seam based on the exposure. A graph-cut optimization technique is used to select pixels for inclusion in the final composite image that minimize the data and seam costs. The final composite image is a high-quality panoramic HDR image that contains the spatial extent and the exposure extent of the input image set.

The panoramic HDR system includes modules for incorporating the panoramic HDR method described above. In particular, the panoramic HDR system includes an input image set that contains images capturing a scene, where the images have varying exposures and at least partial spatial overlap. The panoramic HDR system also includes a geometric alignment module, which registers each image in the input image set, and a radiometric alignment module, which ensures that the images are consistently color balanced. The radiometric alignment module includes an optional reference selection module and a gain adjuster. The reference selection module (if used) selects a reference image from the input image set, wherein the reference image has a desirable color balance. The gain adjuster is used to adjust the gain for each color channel in each of the remaining images such that the color balance of each image matches the color balance for the reference image.

The panoramic HDR system also includes an image selection module that determines how the images in the input image set should be combined. The image selection module includes a reference panorama generation module and a pixel labeling module. The reference panorama generation module selects a subset of images from the input image set. The subset is chosen such that the entire available spatial extent of the captured scene is represented. The subset is used to generate a reference panorama. The pixel labeling module is used to find the optimal pixel labeling from pixels in the input image set for use in a final panorama. The "optimal" or "best" pixel labelings are used to fill in the reference panorama and create the final panorama such that the complete available exposure range is contained in the final panorama. The "optimal" or "best" pixel labelings are defined as those labelings that simultaneously minimize the data costs and the seam costs. Optional modules for post processing the final panorama include an image blending module, which smoothes transitions in the final panorama, and a tonemap module, which process the final panorama for display on a screen.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
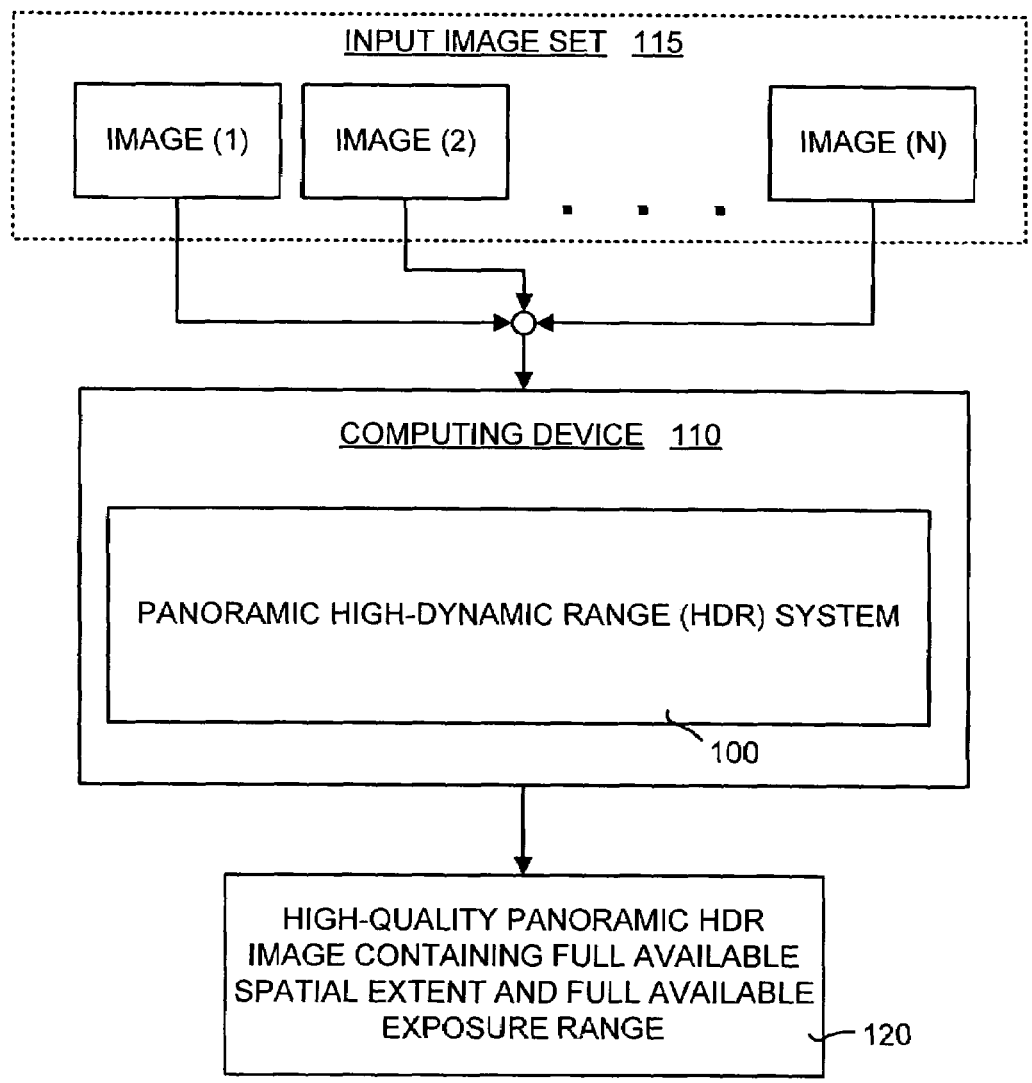
FIG. 1 is a block diagram illustrating an exemplary implementation of a panoramic high-dynamic range (HDR) system and method disclosed herein incorporated into a digital image processing environment.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Current high-dynamic range (HDR) techniques fail to take into account both the spatial extent of a scene and its dynamic range of exposure. These previous image merging techniques for HDR images assume perfect sub-pixel registration. In practice, however, perfect sub-pixel registration is difficult to achieve. This is due to several factors, such as imperfect camera calibration, parallax (especially when the inputs come from a handheld camera, and scene motion. For example, often a photographer will want to capture more of a scene than can be achieved by the camera's field-of-view. This means the photographer typically will take multiple pictures while panning around the scene. Scene motion between the images and parallax can make perfect registration nearly impossible in practice.

Some current techniques address some of these issues by including per-pixel optical flow as part of the registration process. They also modulate the weighting function by a penalty to down-weight radiance values that were not in agreement with an automatically determined "reference" image. However, optical flow can be brittle in the presence of occlusions and the per-pixel decision built into their penalty function can lead to non-smooth results.

Other current techniques create panoramas that avoid scene motion by setting each output pixel as coming from only one input image. The transitions between contributions from one input to another are made in areas of strong agreement between the two inputs. This helps to eliminate some of the artifacts due to misregistration. However, one problem with these techniques is that they do not address how to combine images with different exposures.

The panoramic HDR system and method disclosed herein allows for some scene motion between input images while handling exposure differences. The first step is to create a reference panorama from a subset of the input images. This reference panorama covers the entire available spatial extent of the scene, but not necessarily the full available dynamic range. Because of possible scene motion, not all of the aligned input images necessarily represent the same scene in all regions. The reference panorama, and thus the subset used to create it, is used to define the desired position of moving objects in the scene. The input images to this process can be chosen manually (if specific object positions are desired), or automatically. The creation of the reference panorama does not necessarily avoid using underexposed or saturated pixels. The solution to this problem is achieved in the second step, which is to fill in the complete available dynamic range of the inputs. In this second step, a labeling of pixels is used that minimizes the data cost and the seam cost. The result is a high-quality panoramic HDR image having the full available spatial extent of the scene along with the full available exposure range.

II. General Overview

FIG. 1 is a block diagram illustrating an exemplary implementation of a panoramic high-dynamic range (HDR) system and method disclosed herein incorporated into a digital image processing environment. Referring to FIG. 1, the panoramic HDR system 100 is located on a computing device 110. In general, the panoramic HDR system 100 inputs an image set 115 containing a plurality of images capturing a scene and outputs a panoramic HDR image containing a full spatial extent of the scene and the entire available dynamic range of exposure of the scene.

As shown in FIG. 1, the input image set 115 contains a plurality of images, image (1) to image (N), where N is the total number of input images. The input image set 115 contains a variety of exposures of the scene. In addition, each of the images in the input image set 115 at least partially overlaps in the spatial domain. The input set of images 115 is processed by the panoramic HDR system 100 and the output is a high-quality panoramic HDR image 120. The final panoramic HDR image 120 contains the full available spatial extent of the scene and the full available exposure range of the scene.

III. Exemplary Operating Environment

The panoramic high-dynamic range (HDR) system and method disclosed herein are designed to operate in a computing environment and on a computing device, such as the computing device 110 shown in FIG. 1. The computing environment in which the panoramic HDR system and method disclosed herein operate will now be discussed. The following discussion is intended to provide a brief, general description of a suitable computing environment in which the panoramic HDR system and method may be implemented.

Figure 2:
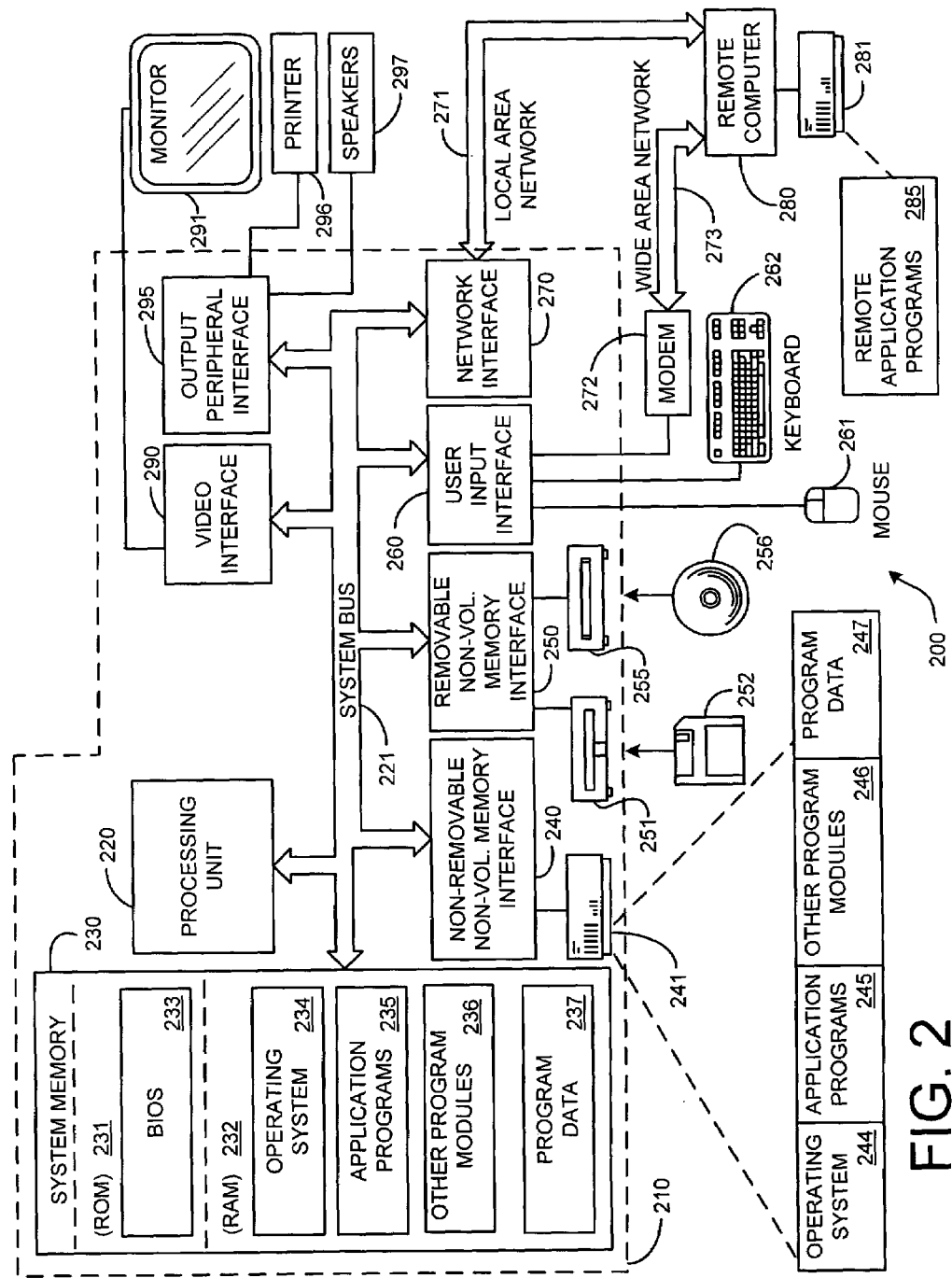
FIG. 2 illustrates an example of a suitable computing system environment in which the panoramic HDR system and method shown in FIG. 1 may be implemented.

FIG. 2 illustrates an example of a suitable computing system environment in which the panoramic HDR system and method shown in FIG. 1 may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The panoramic HDR system and method is operational with numerous other general purpose or special purpose computing system environments or configurations. Examples of well known computing systems, environments, and/or configurations that may be suitable for use with the panoramic HDR system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The panoramic HDR system and method may be described in the general context of computer-executable instructions, such as program modules, being executed by a computer. Generally, program modules include routines, programs, objects, components, data structures, etc., that perform particular tasks or implement particular abstract data types. The panoramic HDR system and method may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the panoramic HDR system and method includes a general-purpose computing device in the form of a computer 210. The computer 210 is an example of the computing device 110 shown in FIG. 1.

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor 291, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

IV. System Components

Figure 3:
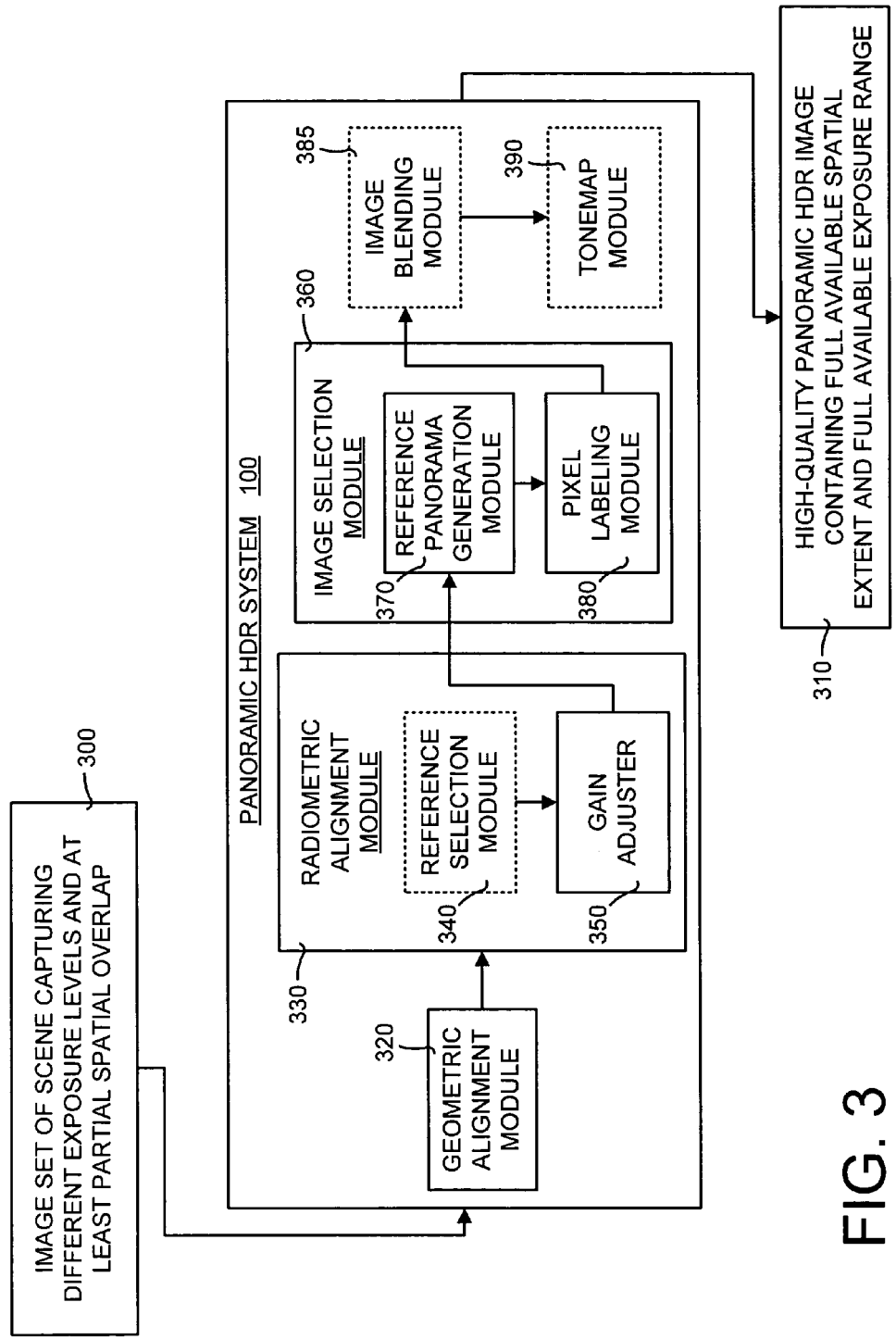
FIG. 3 is a general block diagram illustrating components of the panoramic HDR system shown in FIG. 1.

FIG. 3 is a general block diagram illustrating components of the panoramic HDR system 100 shown in FIG. 1. The panoramic HDR system 100 inputs an image set 300, processes the input image set 300, and outputs a high-quality panoramic HDR image 310. The input image set 300 contains images that capture a scene at various exposure levels. In addition, the images of the input image set 300 capture a spatial extent of the scene, wherein at least some of the images partially overlap in the spatial domain. The high-quality panoramic HDR image 310 contains the entire spatial extent of the scene that was captured in the input image set 300. Moreover, the high-quality panoramic HDR image 310 contains the entire range of exposure (or full dynamic intensity range) of the scene that was captured in the input image set 300.

The high-quality panoramic HDR system 100 includes a number of modules that perform processing on the input image set 300 (or a subset thereof). More specifically, the high-quality panoramic HDR system 100 includes a geometric alignment module 320 that determines an orientation or position of an image in the input image set 300 relative to the other images of the set 300. The geometric alignment module 320 registers images having varying exposures. A radiometric alignment module 330 normalizes the geometrically-aligned images and takes into account exposure differences between images plus any other processing performed by the camera. The radiometric alignment module 330 includes a reference selection module 340 and a gain adjuster 350. The reference selection module 340 selects an image from the input image set 300 that has an acceptable color balance. This selected image is designated as the reference image. This is an optional step, as shown in FIG. 3 by the dotted line surrounding the reference selection module 340. Alternative ways of performing radiometric alignment without using the reference image are discussed below. The gain adjuster 350 adjusts the gain of each color channel to that of the gain in the corresponding color channel of the reference image.

The high-quality panoramic HDR system 100 also includes an image selection module 360 that generates an output image having an entire available spatial extent and exposure range of the scene. The spatial extent and exposure range contained in the output image are dependent the spatial extent and exposure range of the images in the input image set 300. The image selection module 360 includes a reference panorama generation module 370 and a pixel labeling module 380. The reference panorama generation module 370 uses a subset of the input image set to obtain the full available spatial extent of the scene without regard to exposure. This means that underexposed and saturated pixels may be used. This generates a reference panorama containing the full available spatial extent of the scene. The pixel labeling module 380 examines pixels in images of the input image set 300 in order to fill in and augment the exposure detail of the reference image. This filling in process gives the output reference panorama the full available exposure range of the scene.

The high-quality panoramic HDR system 100 also contains optional post-processing modules. These modules include an image blending module 385 and a tonemap module 390. The optional nature of these modules 385, 390 is shown in FIG. 3 by the dotted lines outlining the two modules 385, 390. The image blending module 385 blends the labeled pixels in the output reference panorama merge the gradients of the original images to ensure that the pixel values match up at the seams of the output reference panorama. The tonemap module 390 compresses the radiance values of the pixels in the output reference panorama to ensure that the output reference panorama can be displayed on a screen. The final output is the high-quality panoramic HDR image 310.

V. Operational Overview

Figure 4:
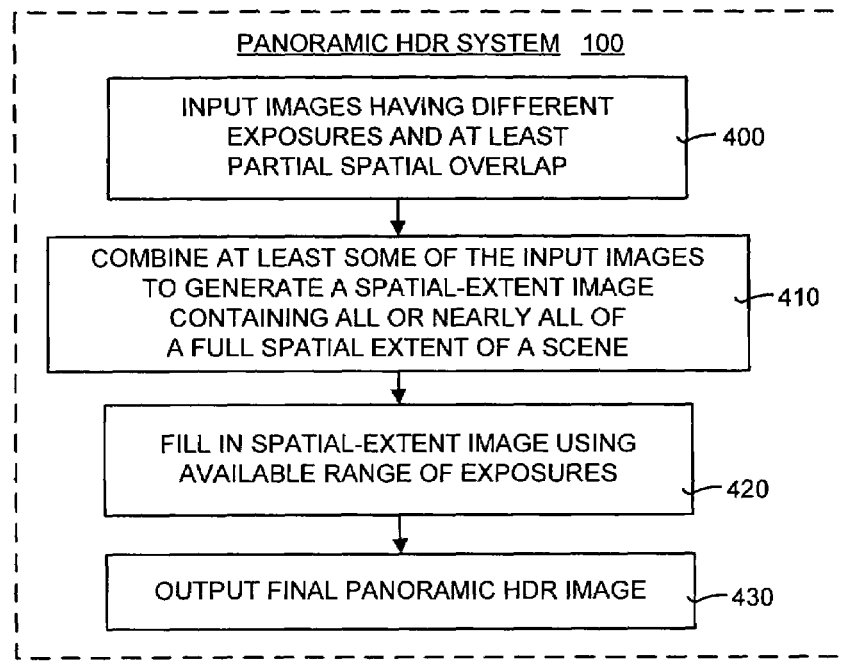
FIG. 4 is a general flow diagram illustrating the general operation of the panoramic HDR system and method shown in FIGS. 1 and 3.

The operation of the panoramic HDR system 100 and method used therein as shown in FIGS. 1 and 3 now will be discussed. FIG. 4 is a general flow diagram illustrating the general operation of the panoramic HDR system 100 and method shown in FIGS. 1 and 3. The method begins by inputting an input image set capturing a scene (box 400). The input image set contains images having different exposures and at least partial spatial overlap. Next, the method combines at least some images from the input image set to generate a spatial-extent image (box 410). This is spatial-extent image is a reference panorama, and contains most or all of the full available spatial extent of the scene. In other words, most or all of the entire spatial extent of the scene that was captured in the images of the input image set is contained in the reference panorama.

The method then fills in the spatial-extent image (or reference panorama) using an available range of exposures (box 420). This filling in and augmentation process (or pixel labeling process) uses all or some of the images of the input image set. As explained in detail below, this pixel labeling process selects exposure (or radiance) values corresponding to pixels from the input image set such that the pixels used for filling in the reference panorama simultaneously have the best exposures and the least amount of visible inter-image transitions. This is achieved by minimizing costs. Namely, pixels that simultaneously minimize data costs and seam costs are preferred. Once the pixel labeling process is completed for all pixels in the reference panorama, the final output is a panoramic HDR image (box 430).

VI. Operational Details

Figure 5:
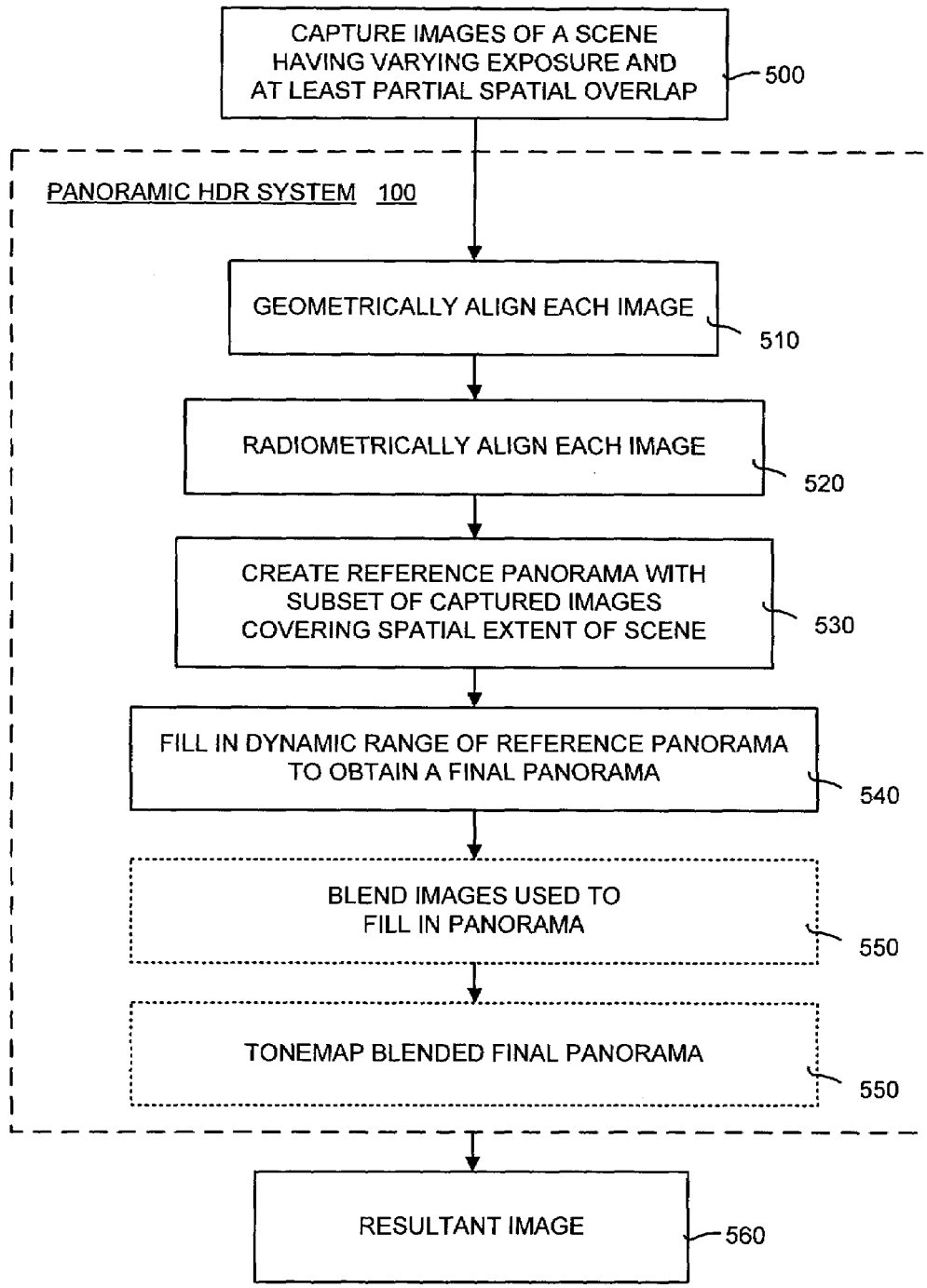
FIG. 5 is a flow diagram illustrating further details of the panoramic HDR method shown in FIG. 4.

The operational details of the panoramic HDR system 100 and method of FIGS. 1, 3 and 4 will now be discussed. FIG. 5 is a flow diagram illustrating the further details of the panoramic HDR method shown in FIG. 4. Specifically, images of a scene are captured in an input image set (box 500). The images of the input image set have varying exposures and at least partial spatial overlap of the scene. Thus, the scene is captured while the camera is varying the exposure, the spatial orientation, or both. One way in which the camera may vary the exposure is by using auto-bracketing. Auto-bracketing is a feature that automatically takes multiple pictures while varying the exposure. Typically, a photographer selects an exposure and the auto-bracketing feature takes photographs at the selected exposure along with pictures above and below the selected exposure. The spatial extent of the scene typically is varied by panning the camera and taking multiple pictures to capture a wider field-of-view than could be captured with a single picture. The input image set is an input to the panoramic HDR system 100.

Initially, the method geometrically aligns each image in the input image set (box 510). Geometric alignment determines an orientation or a position of an image in the input image set relative to the other images in the set. The critical thing about the geometric alignment technique is that it should be robust to exposure differences and be able to register images having varying exposures. Two geometric alignment techniques that work well are described in a paper by M. Brown and D. G. Lowe entitled, "Recognizing panoramas" in *Proceedings of the Ninth IEEE International*

Conference on Computer Vision, pp. 1218–1225, IEEE Computer Society, 2003, and in a co-pending patent application U.S. Ser. No. 10/833,760 entitled "Multi-Image Feature Mapping using Oriented Patches" by Richard S. Szeliski and Matthew A. Brown filed Apr. 27, 2004. In a preferred embodiment, the latter technique, also called the Multi-Scale Oriented Patches (MOPS) technique, is used to geometrically align the images.

Next, the geometrically-aligned images are radiometrically aligned (box 520). Once the images are geometrically aligned, it is possible to look at a pixel in one image and find its corresponding pixel in another image. Because of exposure differences, however, the pixels may not have the same value. For this reason, normalization in the form of radiometric alignment needs to be performed. Normalization means taking into account exposure differences plus any other processing that the camera performs. The radiometric alignment process actually goes back to a number at each pixel location that represents a true measure of light in the scene, instead of a number that represents what the camera did after all of its processing.

The radiance from the scene entering the camera has a certain measure of intensity of light. This is consistent from image to image. The intensity of the scene does not change. What does change is the processing that the camera performs for each image. For example, the shutter speed changes and the aperture size (and thus exposure) changes. Moreover, other processing such as ISO, white balance, and proprietary curves that are applied to the image. Using the radiometric alignment, all of this processing is "backed out". Using the radiometric alignment, a number is obtained that represents the actual radiance in the scene before the camera processing.

In general, modern digital cameras store image processing values with each image as an exchangeable image file (EXIF) tags. These EXIF tags include shutter speed, aperture size, and ISO. However, the white balance typically is not stored. This means that the white balance must be obtain by another means. In addition, different cameras apply different amounts of white balance and different amounts of gain to different color channels. As used this specification, the term "white balance" means a separate gain applied to each of the red, green, blue (RGB) color channels. As discussed in detail below, the panoramic HDR system and method include a novel radiometric alignment technique for providing radiometric alignment to the input image set.

A reference panorama then is created (box 530). The reference panorama is created using a subset of the input image set. In addition, the reference panorama covers all or nearly all of the entire available spatial extent of the scene. As described in detail below, when creating the reference panorama the images from the input image set are chosen based on the spatial content of the image and not the exposure content. Thus, underexposed images and overexposed (saturated) images may be used to construct the reference panorama.

Next, the dynamic range of the reference panorama is filled in to obtain a final panorama (box 540). This is achieved by taking a spatial location of the reference panorama and finding a pixel in the input image set having the best intensity for that spatial location. This pixel is labeled as the preferred pixel to use at that spatial location when constructing a final panorama. A set of "best" pixels is determined by selecting the pixels that simultaneously minimize the summed data costs and seam costs. These techniques are discussed in further detail below.

Once the final panorama is generated, it may be post-processed using two optional techniques. These two techniques are shown as optional in FIG. 5 by the dotted lines. First, the images used in the final panorama may be blended (box 550). Image blending smoothes the seams where pixels from different images are combined to form the final panorama. Second, the blended panorama may be tone mapped (box 550). Typically, the final panorama contains more radiance than can be shown on a screen. The tone mapping technique allows the final panorama to be displayed on a screen. The resultant image of processing by the panoramic HDR system 100 and method is output (box 560).

Radiometric Alignment Module

Figure 6:
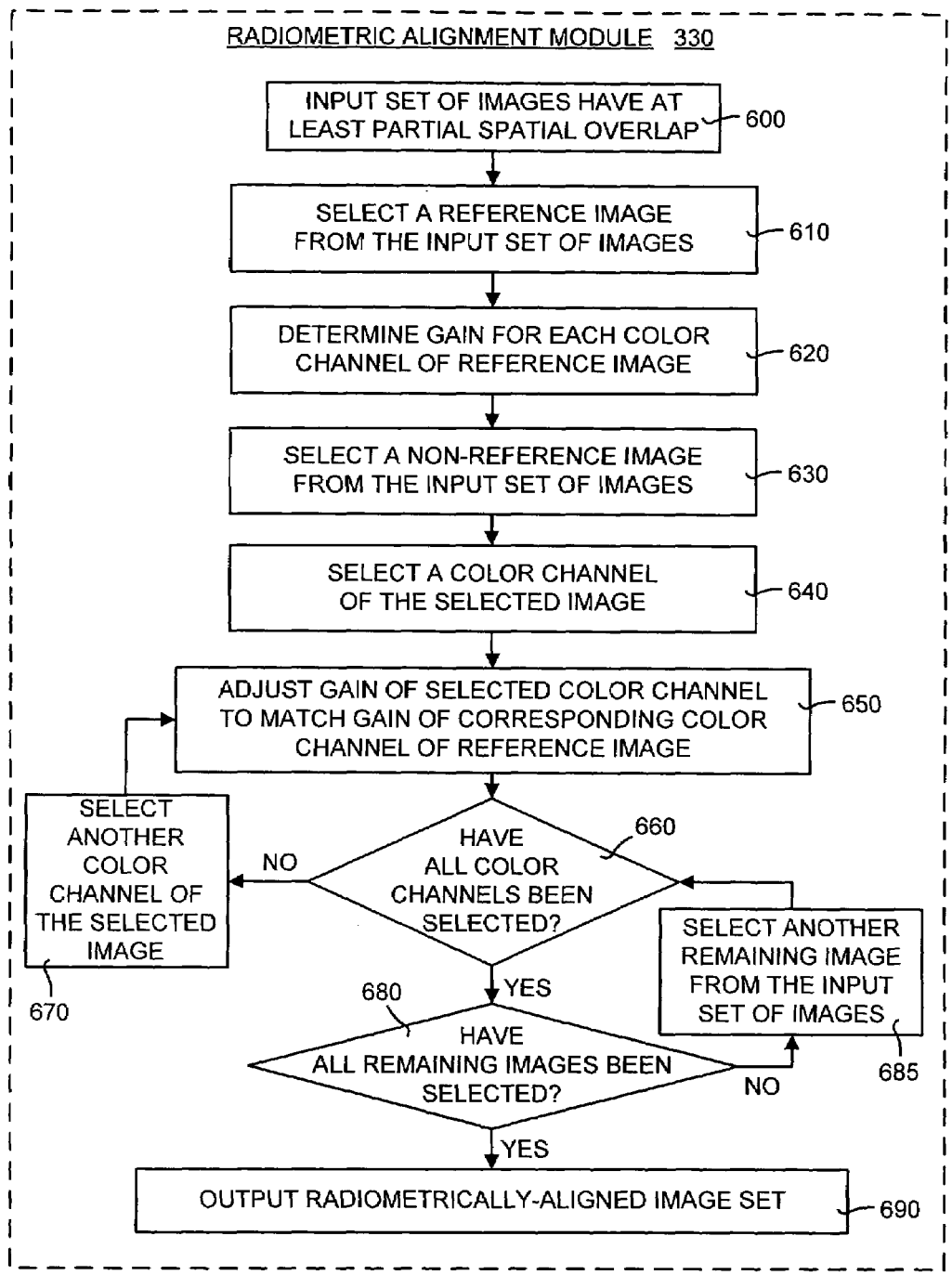
FIG. 6 is a detailed flow diagram of the operation of the radiometric alignment module of the panoramic HDR system and method shown in FIG. 3.

FIG. 6 is a detailed flow diagram of the operation of the radiometric alignment module 330 of the panoramic HDR system 100 and method shown in FIG. 3. This radiometric alignment is an optional process, because a camera manufacturer or camera could provide the information needed. However, typically the camera manufacturer or camera does not provide information such as white balance. In such cases, the novel radiometric alignment technique described herein may be used to radiometrically align the images.

In general, the radiometric alignment module 330 normalizes the gain of each image such that the gains for each color channel are similar. In other words, the process inputs images that at least partially spatially overlap and adjusts the gain of each color channel to make each of the images in the input image set consistently color balanced with one another.

Specifically, referring to FIG. 6, the novel radiometric alignment process begins by inputting a set of images having at least partial spatial overlap (box 600). A reference image is selected from the input image set (box 610). In one embodiment, the reference image is selected by a user. The user selects one image from the input image set that has a color balance that the user likes. Then, given the known camera parameters, all the images are converted to an approximate radiance image. This radiance image is approximate due to the unknown gain at each color channel. This means that the gain of each color channel of the images must be determined (box 620).

One of the non-reference images from the input image set then is selected (box 630). A color channel (typically one of the red, green, blue (RGB) color channels) of the chosen image is selected (box 640). Next, the gain of the chosen color channel is adjusted to match the gain of the corresponding color channel of the reference image (box 650). The goal of this process is to bring each of the other images into the same (or nearly the same) color balance as the reference image. This is done by applying a gain as needed to each of the color channels. A determination then is made as to whether all color channels have been selected (box 660). If not, then another color channel of the chosen image is selected (box 670). Then the process begins again by adjusting the gain of that color channel to match the gain of the corresponding color channel in the reference image.

This means there is a need to solve for a gain for each image in each of the RGB color channels such that the gains match the color balance of the reference image. This is done be constructing an equation having an error term E, where the G values are unknown. The equation is as follows:

$$E = \sum_{p \in \text{ valid overlap}(1,R)} (L'_{p,1} G_{1R} - L'_{p,R})^2 + \quad (1)$$

$$\sum_{p\varepsilon\, valid\, overlap(1,3)} (L'_{p,1}G_{1R} - L'_{p,3}G_{3R})^2 + \dots ,$$

Equation (1) says that a red value (for example) times some unknown gain should equal the red value of the reference image. However, typically the values are not equal, so there is an error, E. The goal is to minimize the sum of the squared errors. Equation (1) can be solved using standard techniques such as least squares.

If all of the color channels have been selected, then another determination is made as to whether all of the remaining images have been examined (box 680). If not, then another one of the remaining images from the input image set is selected (box 685). Otherwise, the radiometrically-aligned set of images is output that contains the recovered radiances values for the captured scene (box 690).

In another embodiment, the reference image is not used. In this alternative embodiment, all of the images in the input image set are adjusted in order to make the gains of all the color channels as similar as possible. In this case, equation (1) has an added constraint that the G's should be as close to 1 as possible. This makes equation (1) well-determined, even without the reference image. Thus, equation (1) becomes:

$$E = \sum_{p\varepsilon\, valid\, overlap(1,2)} [(L'_{p,1}G_1 - L'_{p,2})^2 + (L'_{p,1}(1 - G_1))^2 + (L'_{p,2}(1 - G_2))^2] + \dots \quad (1A)$$

Equation (1A) defines the error term, E, without using a reference image. In equation (1A), there is not reference image and thus there are no terms with the subscript, R. Equation (1A) applies a gain, $G_i$, to each image, i, but penalizes gains more the further away they get from a value of 1.

Image Selection Module

Figure 7:
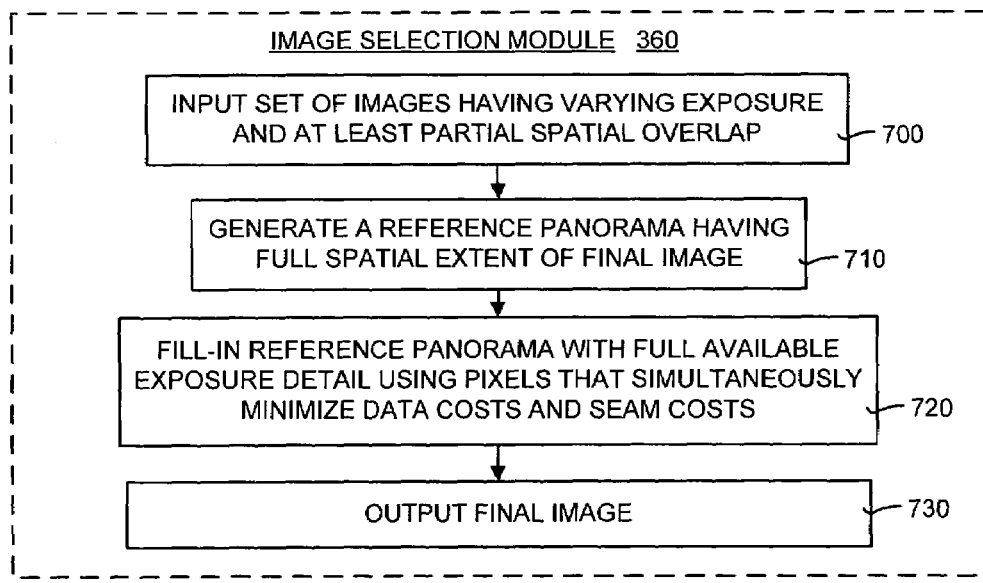
FIG. 7 is a detailed flow diagram of the operation of the image selection module of the panoramic HDR system and method shown in FIG. 3.

FIG. 7 is a detailed flow diagram of the operation of the image selection module 360 of the panoramic HDR system 100 and method shown in FIG. 3. In general, the image selection module generates a reference image having the full available spatial extent of a scene and then fills in the full available exposure range using the best available pixels from the input image set. In particular, an input set of images capturing a scene and having varying exposure and at least partial spatial overlap is input (box 700). A reference panorama then is generated that contains all or nearly all of a full available spatial extent of a scene (box 710). The reference panorama then is filled in using a full available exposure detail (box 720). The pixels used to fill in the reference panorama are those pixels that simultaneously minimize data costs and seam costs. Next, the final panoramic HDR image is output (box 730).

Reference Panorama Generation Module

The image selection module 360 contains a reference panorama generation module 370. In the geometric alignment process, the camera movement is computed, but nothing accounts for scene motion, or the fact that objects may have moved in the scene. The reference generation module 370 finds the minimum set of images that cover the spatial extent of the scene.

Figure 8:
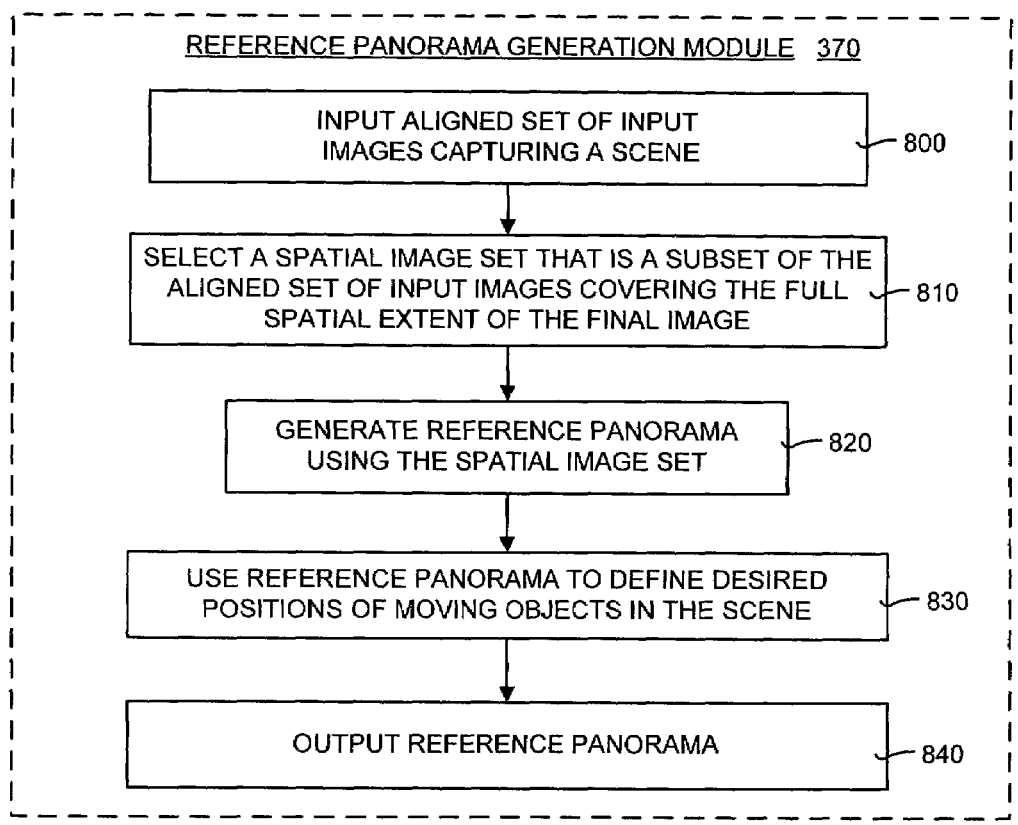
FIG. 8 is a detailed flow diagram of the operation of the reference panorama generation module of the panoramic HDR system and method shown in FIG. 3.

FIG. 8 is a detailed flow diagram of the operation of the reference panorama generation module 370 of the panoramic HDR system 100 and method shown in FIG. 3. The process begins by inputting an aligned set of input images capturing a scene 800. Next, a spatial image set is selected that is a subset of the aligned set of input images (box 810). The spatial image set covers all or nearly all of the entire available spatial extent of the scene. In one embodiment, images having the shortest exposure were used to construct the spatial image set. This was done to avoid problems with saturation. However, other techniques may be used, such as selecting images in the middle of the exposure range or having a user select images that have object in the position that the user wants. The main objective is to find images that cover all or nearly all the entire available spatial extent of the scene.

Once the spatial image set is found, a reference panorama is generated (box 820). The reference panorama is used to define the desired positions of moving objects in the scene (box 830). The reference panorama then is output (box 840). A graph-cut optimization technique is used to find the best possible seams between images. The graph-cut optimization technique is described in a paper by A. Agarwala, M. Dontcheva, M. Agarwala, S. Drucker, A. Colburn, B. Curless, D. Salesin and M. Cohen, entitled "Interactive digital photomontage" in *ACM Trans Graph.*, 23(3):294–302, 2004. The "best possible seams" means that the reference panorama has smooth transitions between pixels even if the pixels are from different images of the input image set. One problem with the Agarwala et al. paper, however, is that it does not address the issue of varying exposure. Thus, if the sky is washed out the graph-cut optimization technique would happily keep that image.

Pixel Labeling Module

In the next step or second pass of the image selection process the panoramic HDR system 100 and method addresses this exposure issue. This is performed by the pixel labeling module 380. The main purpose of the pixel labeling module is to fill in and augment the exposure details of the reference panorama. The images of the reference panorama already define the positions of all moving objects in the scene. This second pass or step adds detail from other images. In this second pass the entire input image set is used.

Figure 9:
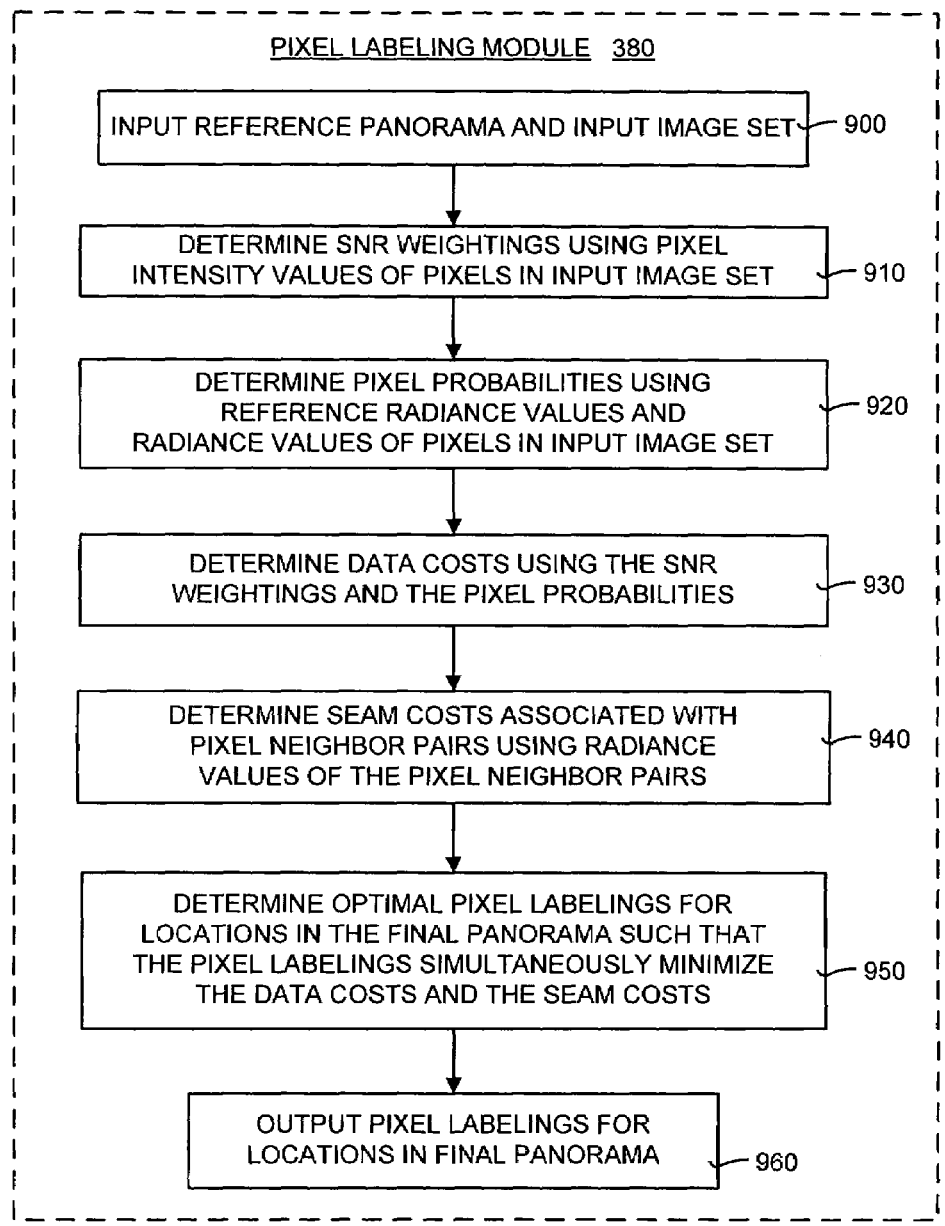
FIG. 9 is a detailed flow diagram of the operation of the pixel labeling module of the panoramic HDR system and method shown in FIG. 3.

FIG. 9 is a detailed flow diagram of the operation of the pixel labeling module 380 of the panoramic HDR system 100 and method shown in FIG. 3. In general, the pixel labeling module 380 fills in the dynamic range when possible and consistent. Data costs are created to encourage radiance values that are both consistent with object placement (which were defined in the first pass) and of a higher signal-to-noise ratio. Seam costs are used to ensure that transitions occur in regions of consistent radiances. The whole point of having seam costs is to make global decisions about how to label the pixels, and simultaneously trying to keep as few transitions as possible while minimizing the data costs. This is an optimization problem, and global energy optimization techniques are used to find pixel labelings that simultaneously minimize the data costs and the seam costs. In a preferred embodiment, the global energy optimization technique used is a graph-cut technique similar to the graph-cut technique described in the Agarwala et al. paper cited above.

The pixel labeling process begins by inputting the reference panorama and the input image set (box 900). Next, SNR weightings are determined using pixel intensity values of pixels in the input image set (box 910). The SNR weighting, W, is given by equation (4), and described in detail below. In equation (4), the saturated pixels are assigned a very large cost, where saturated means that the pixels are at or near the maximum pixel value. Equation (4) assigns a weight to each pixel. The basic idea of equation (4) is that the brighter the pixel value the better, because the brighter pixel has the higher SNR. However, this is true only up to a certain point. When the pixel is so bright that it becomes saturated, equation (4) effectively ignores the saturated pixel.

Next, a pixel probabilities are determined using radiance values of the reference panorama and radiance values of pixels in the input image set (box 920). The pixel probability, P, is given by equation (5), which also is described in detail below. The pixel probability, P, is a term that tells how well a pixel agrees with the reference panorama. The pixel probability, P, is the probability that this radiance value represents the same radiance value as is in the reference panorama. Due to noise, the values to not have to match exactly. However, they must be within a noise threshold. If the probability is within the noise threshold, then the probability is higher that it is the same scene. As the differences get larger, the probability is reduced.

Equation (5) has a special case that says if the reference is saturated then there all that is known is a lower bound on the reference radiance value. In this special case, less is known about how to consider a pixel from another image to fill in the reference panorama. In this case, if the radiance value is greater than the reference radiance, then that pixel is used. This is the top term in equation (5).

Thus, equation (5) states that if the radiance of the selected pixel is greater than the radiance of a saturated reference pixel, then the probability equals "1". Otherwise, a bell-shaped curve is used on the difference of the values (i.e., the difference between the selected pixel and the radiance of the non-saturated reference pixel). As the difference gets larger, the probability approaches zero.

Next, data costs are determined using the SNR weightings, W, and the pixel probabilities, P (box 930). The data cost is given by equation (6), which is set forth and described in detail below. Data costs are the costs of labeling a pixel at a certain location in the final panorama. Essentially, equation (6) is the reciprocal of the product of the SNR weighting, W, and the pixel probability, P. In equation (6), $\lambda$ is a parameter that can be tuned. It is desired that the SNR weighting, W, and the pixel probability, P, contribute in different proportions. The parameter $\lambda$ is a way to tune these proportions. In equation (6), as W and P become larger the cost goes down. In other words, as the SNR value and the pixel probability increase, the cost of choosing that pixel goes down.

In addition to data costs, seam costs also are determined. The seam costs are associated with neighboring pixel pairs. The seam costs are associated with neighboring pixel pairs are determined using radiance values of the neighboring pixel pairs (box 940). The goal is to minimize the seam costs in order to ensure that transitions in the final panorama are smooth. It is desired to transition in areas where two images agree with each other so that seams are not visible. Because there is such a large range of intensities being considered, however, the seam cost process normalizes the seam for exposure. It should be noted that the Agarwala et al. paper does not do this. The seam cost is a function of two adjacent pixels (neighboring pixel pairs). The seam cost is given by equation (7), which is set forth and described in detail below.

Once the data costs and seam costs are determined, the pixel labeling process determines an optimal pixel labeling for locations in the final panoramas. The optimal pixel labeling simultaneously minimizes the data costs and the seam costs (box 950). Minimizing the data costs and seam costs to generate a optimal output pixel labeling is a global energy optimization problem. In one embodiment, this optimization problem is solved using a technique similar to the graph-cut optimization technique described in the Agarwala et al. paper. However, one difference is that the panoramic HDR system 100 normalizes the seam for exposure. Accordingly, equations (3) through (7) take into account the exposure of the image, something that the Agarwala et al. paper does not. The graph-cut optimization technique outputs pixel labelings, which are visualized as different colors in a graph. In alternate embodiments, other optimization techniques may be used. Finally, the pixel labeling module 380 outputs the optimal pixel labelings for locations in the final panorama (box 960).

VII. Working Example

In order to more fully understand the panoramic high-dynamic range (HDR) system 100 and method disclosed herein, the operational details of an exemplary working example are presented. It should be noted that this working example is only one way in which the panoramic HDR system and method may be implemented.

In this working example, the panoramic HDR system and method took as input multiple images that captured a scene at varying orientations and exposures. A feature-based registration technique then was used to automatically align the input images. This registration technique is tolerant to exposure differences. Once the input images were geometrically-aligned, they were mapped to the same global radiance space. This mapping was achieved by using a pre-calibrated camera where the camera settings were extracted from exchangeable image file (EXIF) tags. Next, the unknown color gain for each color channel was determined. Once the radiance values for each of the input images were found, the images were combined by setting each pixel in the output radiance image with the value from one of the input images. This combining was performed in two steps.

First, a subset of the input images was used to create a reference panorama that covered the final output image's angular (or spatial) extent, but not necessarily its full dynamic range of exposure. The reference panorama was created using a "graph-cut optimization" technique set forth in the paper by A. Agarwala et al, cited above. Thus, the resulting composite had optimally smooth transitions even when neighboring pixels in the output were chosen from different inputs. As in Agarwala et al., however, the creation of the reference panorama did not avoid using underexposed or saturated pixels.

The second step of combining images was to add the full available dynamic range to the reference panorama. This step extended the reference panorama's dynamic range of exposure to that available in the full set of input images. Cost functions were introduced that preferred choosing inputs with a larger signal-to-noise while keeping smooth transitions. These costs were minimized via a maximum flow graph cut. Once the input images to use for the final output were selected, image blending was an optional step that could have been performed to smooth any seams. In this working example, the image blending was not used. Another optional step that was used was to apply tone-mapping to the final result that turned the high-dynamic range into a displayable image.

Computing Radiance Maps

In order to register the input images, a feature-based image alignment technique was used that was invariant to affine changes in intensity. This technique was described in the paper by M. Brown and D. G. Lowe, cited above. Once the images were geometrically aligned, a radiometric alignment was performed by computing the radiance value at each pixel $L_{p,i}$. Each pixel value was mapped inversely through a camera model to a value proportional to the true scene radiance. It should be noted that with perfect sub-pixel registration, $L_{p,i}$ and $L_{p,j}$ would be the same for overlapping pixel location p in images i and j.

Figure 10:
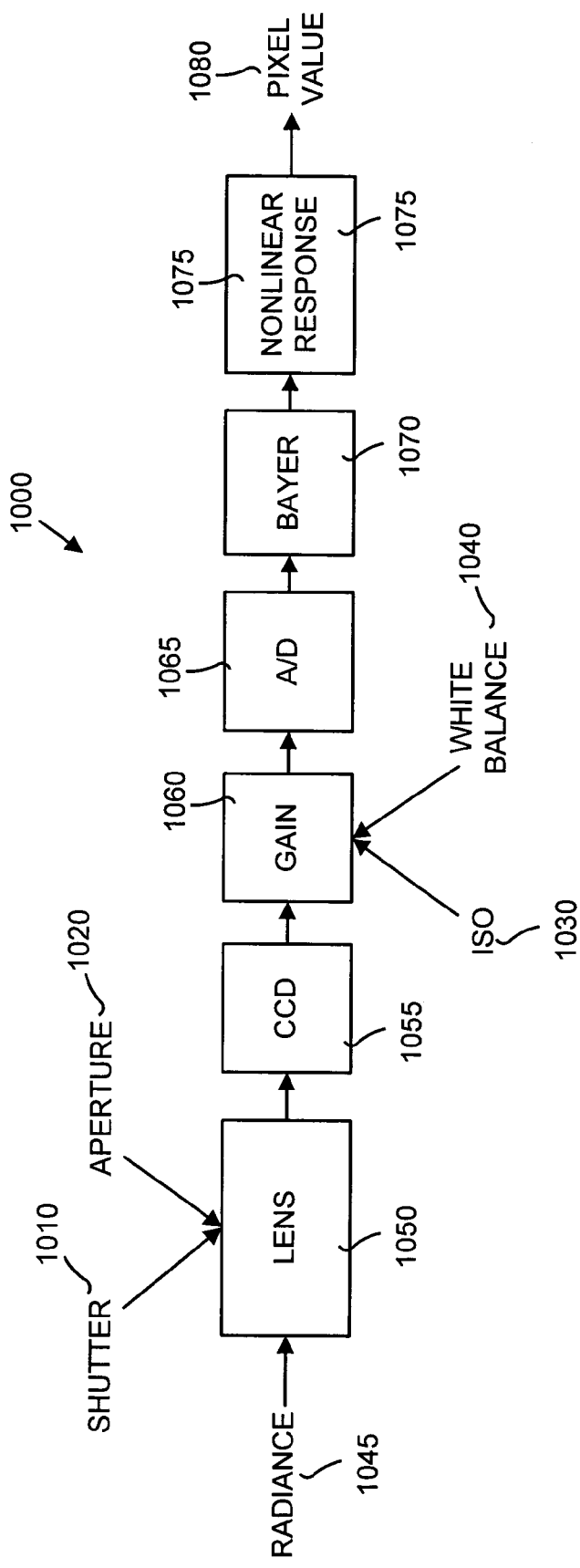
FIG. 10 is general block diagram illustrating the camera model used in an exemplary working example.

FIG. 10 is general block diagram illustrating the camera model 1000 used in this exemplary example. As shown in FIG. 10, the camera settings include shutter speed 1010, aperture 1020, International Organization for Standardization (ISO) "film speed" setting 1030, and white balance 1040. These camera settings are multiplicative factors of the radiance that may vary between the images. In FIG. 10, a radiance 1045 of a scene enters a lens 1050 of the camera model 1000. The radiance 1045 impinges on a charge-coupled device (CCD) 1055 that is controllable by the shutter setting 1010 and the aperture setting 1020. A gain 1060 is controllable by the ISO setting 1030 and the white balance setting 1040. An analog-to-digital converter (A/D) 1065 converts the analog radiance into a digital signal and that signal is processed using a Bayer filter 1070. A nonlinear response 1075 is introduced and a pixel value 1080 is output from the camera model 1000.

The CCD 1055 camera sensor was assumed to have a linear response and a nonlinear function, f( ), was introduced at the camera output. The following equation shown the relationship between the radiance and pixel values:

$$L_{p,i} = g(M_{p,i})/t_i d_i ISO_i WB_i \quad (2)$$

where g( ) is the inverse of the camera response function, M is pixel intensity, and $t_i$, $d_i$, $ISO_i$, and $WB_i$ are the respective shutter speed, aperture, ISO, and white balance of image i. In this working example, the shutter speed, aperture, and ISO were extracted from the EXIF tags of each image i. In most modern digital camera, EXIF tags associated with an image provide this type of information.

Obtaining g( ) is possible using a variety of methods, including:

a. Pre-calibrating the camera using any one of several available prior art techniques;
b. using an International Color Consortium (ICC) profile for the camera; or
c. solving for go directly on the inputs.

In this working example, approach (a) was used. In particular, a technique similar to a technique described in a paper by T. Mitsunaga and S. K. Nayar entitled, "Radiometric self calibration", in *Proceedings of the IEEE Computer Society Conference on Computer Vision and Pattern Recognition*, volume 2, pp. 374–380, June 1999, was used. The only unknown was the white balance.

To calculate the white balance, a rough estimate of the radiance was first computer using the equation:

$$L'_{p,i} = g(M_{p,i})/t_i * d_i * ISO_i \quad (3)$$

where $L'_{p,i}$ was calculated per each red, green, blue (RGB) color channel. One of the images was selected as a reference image. This selection was made manually by determining which image contained the most pleasing color balance. Once the reference image was selected, the idea was to cause the color balance of all the other images to match the color balance of the reference image.

Figure 11A:
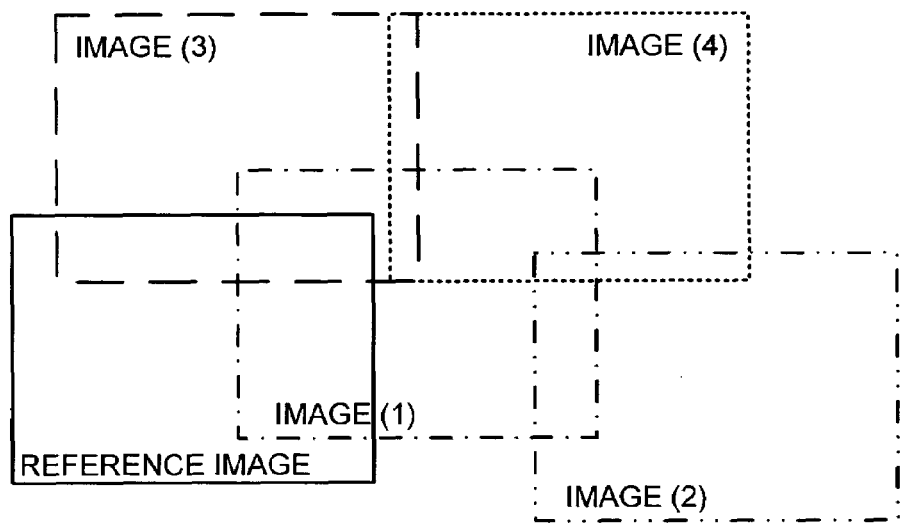
FIG. 11A illustrates of a set of overlapping images used in the working example.

FIG. 11A illustrates an example of a set of overlapping images used in this working example. In FIG. 11A, a set of registered images image (1), image (2), image (3) and image (4) are shown. In addition, one of the images is shown labeled as a reference image (R). After labeling a reference image, the next step is to compute the per color channel gain such that each non-reference image (i.e., image (1), image (2), image (3), image (4)) matches the color balance of the reference image (R).

Figure 11B:
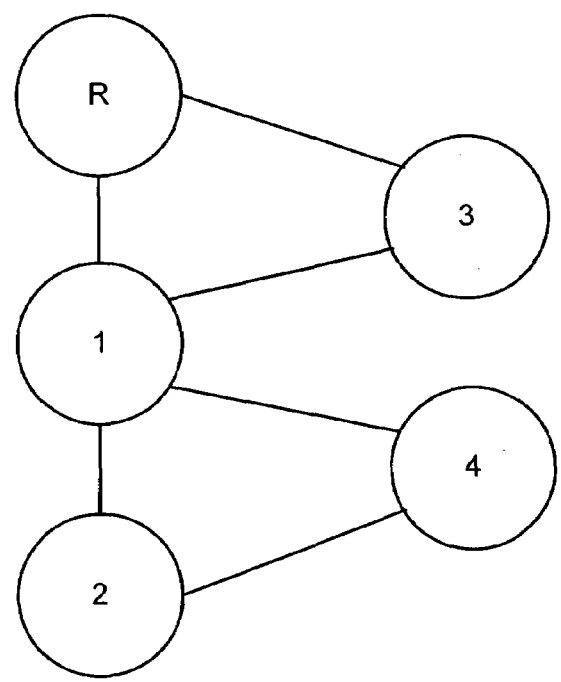
FIG. 11B illustrates a corresponding overlap graph of the images shown in FIG. 11A.

To achieve this, a graph of how the images relate to each other is considered. FIG. 11B is a corresponding overlap graph of the images shown in FIG. 11A. In FIG. 11B, each image is a node that an edge connects overlapping images. Along each edge in the graph of FIG. 11B, a sum of squared difference error term was constructed between overlapping pixels. This term was multiplied by an unknown gain. The gain between the image i and the reference image was denoted by $G_{iR}$, and the total error for this working example shown in FIGS. 11A and 11B was given by the novel equation:

$$E = \sum_{p \in valid\ overlap(1,R)} (L'_{p,1} G_{1R} - L'_{p,R})^2 + \\ \sum_{p \in valid\ overlap(1,3)} (L'_{p,1} G_{1R} - L'_{p,3} G_{3R})^2 + \ldots, \quad (1)$$

In other words, referring to FIGS. 11A and 11B, the differences between the scaled values in the overlap between image (1) and image (R), then image (1) and image (3), and so forth, were summed. Valid pixels p in overlapping images were selected to avoid underexposed and saturated values. The unknown gains were solved for using a least squares technique. Once the gains were obtained, these gains were applied inversely to L', thus normalizing out the color balance differences to obtain the final radiance value for each pixel in each image.

Image Selection

The panoramic HDR system and method include an image selection technique that allows for some scene motion between input images while also handling exposure differences. In this working example, the first step in the image selection process was to create a reference panorama from a subset of the input images. The reference panorama covered the final output image's entire angular (or spatial) extent. However, the full dynamic range was not included. Because of possible scene motion, not all of the aligned input images necessarily represented the same scene in all regions. The reference panorama, and thus the subset used to create it, was used to define the desired position of moving objects in the scene. The input images to this step can be selected manually (if specific object positions are desired), or may be chosen automatically. In this working example, the reference panorama was created using a technique similar to that of the Agarwala et al. paper cited above, except that in this working example the selection was done in radiance space. The creation of the reference panorama, however, does not avoid using underexposed or saturated pixels. Avoiding these underexposed or saturated pixels was achieved in the in the second step of the process by adding the full dynamic range available from the input images.

The second step of the image selection process was to further refine the reference panorama by filling in the entire dynamic range that was available in the input images. In other words, the reference panorama was used as a base and more detail was added where available from the full set of input images. During the generation of the reference panorama, there was no penalty for choosing regions where the radiance values came from very dark or saturated input pixels. In the second step, detail was added in these regions if it was available and if it was consistent with scene given by the reference panorama. To do this, a cost for using the radiance value from image i at pixel p final panorama was defined.

When the labeling $\Lambda_p$ for any location p in the reference panorama was determined, the idea was to choose pixels having a high probability P that they came from the same objects as the reference and that also have a high signal-to-noise ratio (SNR), W. The following equation was used to compute the SNR weighting for a pixel with intensity value M:

$$W(M) = \begin{cases} M & \text{if } M \text{ not saturated,} \\ W_{\min} & \text{otherwise.} \end{cases} \quad (4)$$

It should be noted that as the pixel intensity value increases, the SNR increases. When M is saturated, however, the pixel is down-weighted by assigning it a minimal weight.

The radiance consistency for a pixel with radiance $L_{p,i}$ at pixel location p in image i is given by:

$$P(L_{p,i}, L_{p,ref}) = \begin{cases} 1 & \text{if } L_{p,ref} \text{ is saturated} \\ & \text{and } L_{p,i} > L_{p,ref}, \\ e^{\text{?}} & \text{otherwise,} \end{cases} \quad (5)$$

(?) indicates text missing or illegible when filed where δ is the standard deviation of the noise in the imaging pipeline. In equation (5), there are two cases.

If a pixel in the reference panorama was not saturated, a Gaussian noise model was used to determine the probability that an overlapping image's radiance value corresponds to the same scene. If a pixel in the reference panorama was saturated, all that is known is the lower bound on its radiance value. In this case, if an overlapping image's radiance value was greater than the reference value, it was declared to be consistent and P was set to 1. If it was less than the reference radiance, it was treated in a similar manner to the reference not be saturated. Taking a difference of radiance values when one is saturated is fine in this instance. The only problem with taking a difference is that the difference will not be accurate since saturated values give only a lower bound of the true value. The larger the disparity, however, the smaller the probability will be, which itself is accurate.

Using equations (4) and (5), the data cost DC(i) for selecting image i as the labeling of the panorama at pixel p was determined as:

$$DC(i) = \lambda / W(M_{p,i}) P(L_{p,i}, L_{p,ref}) \quad (6)$$

where λ is a parameter used to regularize Wand P. Since DC is a cost, higher values signify less desirable labelings. Thus, DC is inversely proportional to W and P.

The data cost was used as a cost for selecting a given pixel based on information only at that pixel location. Because a single input image does not generally cover the entire spatial or dynamic range of the output image, there was also needed a criterion for a good transition form one image to another. As in the Agarwala et al. paper that was cited above, there was a separate smoothness penalty. To determine the penalty for labeling pixel p in the output with image i (in other words, setting $\Lambda_p$=i), a seam cost C over each neighbor of p was calculated. For pixel p at location (x,y), consider one of its neighbors p'. The current labeling in the output panorama at p' was given by $\Lambda_p$=j. The seam cost over p and p' was thus given by:

$$C(p, p', i, j) = \frac{|L_{p,i} - L_{p,j}| + |L_{p',i} - L_{p',j}|}{L_{p,i} + L_{p,j}}. \quad (7)$$

It should be noted that since the inputs may have a very wide range of radiance values, the seam cost is normalized by the average of the two radiance values under consideration.

The goal of the second step of the image selection process is to find the labeling of the output image pixels that minimized the data cost and the seam cost. Determining this optimal labeling could have also been performed using an energy minimizing graph cut technique. This technique is described in papers by Y. Boykov, O. Veksler, and R. Zabih entitled, "Fast approximate energy minimization via graph cuts" in *IEEE Trans. Pattern Anal. Mach. Intell.*, 23(11): 1222–1239, 2001 and V. Kolmogorov and R. Zabih entitled "What energy functions can be minimized via graph cuts?" in *IEEE Trans. Pattern Anal. Mach. Intell.*, 26(2):147–159, 2004.

Image Blending and Tone Mapping

Once the labeling of each pixel in the output image was computed, the decision was made not to apply Poisson Blending to the image. Instead, the corresponding radiance value of the output pixel was directly copied into the final high dynamic range image. However, Poisson Blending could have been applied to the output image to merge the gradients from the original input images. Poisson Blending is described in detail in papers by P. Perez, M. Gangnet, and A. Blake entitled "Poisson image editing" in *ACM Transactions on Graphics* (TOG), 21(3):267–276, 2002, and A. Levin, A. Zomet, S. Peleg and Y. Weiss entitled "Seamless image stitching in the gradient domain" in *Eighth European Conference on Computer Vision* (ECCV 2004), volume IV, pp. 377–389, Prague, May 2004, Springer-Verlag, and in the Agarwala et al. paper cited above. Applying Poisson Blending can often help hide any inconsistencies in the radiance estimates between the different input images. However, Poisson Blending can also lead to artifacts if strong intensity edges from different images are not selected consistently.

The optional step of tone mapping was also used in order to display the final panoramic HDR image. A variety of tone mapping algorithms may be used, including those described in papers by F. Durand and J. Dorsey entitled "Fast bilateral filtering for the display of high-dynamic range images" in *ACM Transactions on Graphics* (TOG), 21(3):257–266, 2002, and R. Fattal, D. Lischinski, and M. Werman entitled "Gradient domain high dynamic range compression" in *ACM Transactions on Graphics* (TOG), 21 (3):249–256, 2002, and R. Reinhard et al. entitled "Photographic tone reproduction for digital images" in *ACM Transactions on Graphics* (TOG), 21(3):267–276, 2002.

Results

Figure 12A:
FIGS. 12A–E illustrate results from a first input image set used in this working example.

The results generated by the working example of the panoramic HDR image system and method will now be discussed. The results that will be shown are from three different input sets. FIGS. 12A–E illustrate results from a first input image set used in this working example. In FIGS. 12A–E, the input images were taken with a handheld camera, and have very different exposures and significant scene motion. FIG. 12A shows the input images, which are an exposure bracketed triplet of image.

Figure 12B:
Figure 12C:
Figure 12D:

In FIG. 12B, the reference images selected is shown. In this case, the reference image was simply the middle exposure image. Because of this, the moving child's position is defined by that image. In static parts of the scene, image detail is added to the reference in the second pass of image selection as appropriate. The darker portions of the indoors are taken from the longer exposure, while the brighter portions are taken from the shortest exposure. The pixel labeling corresponding to this is shown in FIG. 12C. The final result after tone-mapping is shown in FIG. 12D. The results are good despite the large amount of scene motion.

Figure 12E:

As a comparison, in FIG. 12E the result was compared to an HDR video result described in a paper by S. B. Kang, M. Uyttendaele, S. Winder, and R. Szeliski entitled "High-dynamic range video" in *ACM Trans. Graph.*, 22(3):319–325, 2003. In FIG. 12E, it should be noticed that there are artifacts in the HDR video result due to optical flow errors and the per-pixel image selection decision. The results produced by the panoramic HDR image system and method (shown in FIG. 12D) are better than those produced by the HDR video (shown in FIG. 12E), especially outside the window and near the ice cream cone.

Figure 13A:
FIGS. 13A–F illustrate results from a second input image set used in this working example.
Figure 13B:
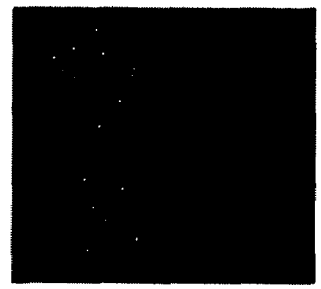
Figure 13C:
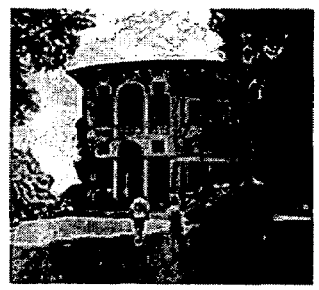
Figure 13D:
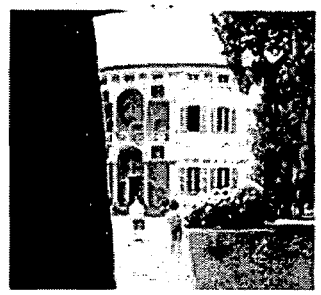

FIGS. 13A–F illustrate results from a second input image set used in this working example. FIGS. 13A–F show a typical panorama case of a rotating camera with variable gain and some moving people in the scene. The input image set is only two images. These registered inputs images are shown in FIGS. 13A and 13D.

FIG. 13B shows the results of pixel labeling a reference panorama and FIG. 13C shows the results of tone-mapping the reference panorama. These results were generated by the first pass in the image selection. In this situation, the reference panorama is essentially what would have been generated by the method described in the Agarwala et al. paper if that technique worked in radiance space instead of pixel space. As in the Agarwala et al. paper, the generation of the reference panorama does not avoid saturated sections of the inputs.

Figure 13E:
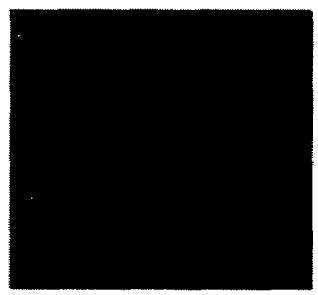
Figure 13F:

The results of the second pass are shown in FIGS. 13E and F. FIG. 13E shows the pixel labeled final panorama and FIG. 13F shows the tonemapped final panorama. Notice that where possible, saturated pixels were replaced after comparison to the reference. In places where saturated pixels were not replaced (because their radiance values were clipped), the pixels show up as gray. Most of the saturated pixels after the second pass, however, are in a region that was only covered by one input image, which happened to have saturated values. Given this lack of further information, there is no way the second pass could have extended the dynamic range.

Figure 14A:
FIGS. 14A–C illustrate results from a third input image set used in this working example.
Figure 14B:
Figure 14C:
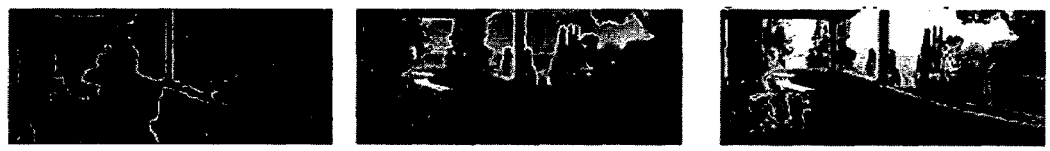

FIGS. 14A–C illustrate results from a third input image set used in this working example. FIG. 14A shows the input image set, which was obtained using a rotating camera in auto-bracket mode. At each camera position, three exposures were captured. FIG. 14A shows the images after geometric registration. It should be noticed that there is a fair amount of parallax in the inputs, as can be seen by pole at the center of the images relative to the trees. There is also a person moving slightly in the scene.

FIG. 14B shows the reference panorama obtained from a first pass of the panoramic HDR image system and method. The reference panorama was generated from the input images of shortest exposures. A tone-mapped result is shows for the reference panorama, but since the reference is not an HDR image (because it does not have its full possible dynamic extent at this point), this is done mainly to illustrate the noise in the darker portions of the scene.

FIG. 14C shows the final result after a second pass of the panoramic HDR image system and method. Notice from the label and tone-mapped images that there are many places where more detail has been added. The second pass greatly improves on the result of the noisy reference image, while maintaining minimal artifacts due to parallax and scene motion. The tone-mapper that was used did introduce some banding artifacts, and as an alternative output the center images of FIGS. 14B and C show the results of a global range compression curve applied to the radiance images.

It can be seen from the results provided above that the panoramic HDR image method and system is able to deal with at least three different types of input image sets. Namely, inputs sets having: (1) three image auto-bracket; (2) auto-gain; and (3) and bracketed panorama. These three types of input image sets encompasses most ways a photographer will capture inputs.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for processing digital images, comprising:
   inputting an input image set containing a plurality of images capturing a scene, the input image set having different exposures and at least partial spatial overlap;
   combining at least some of the plurality of images to create a reference panorama; and
   generating from the reference panorama a panoramic high-dynamic range (HDR) image having a full available spatial extent of the scene and a full available dynamic exposure range of the scene.

2. The method of claim 1, further comprising using pixel labeling to fill in and augment an exposure detail of the reference panorama using the plurality of images from the input image set.

3. The method of claim 2, wherein pixel labeling further comprises simultaneously minimizing data costs and seams costs of pixels across the panoramic HDR image to determine optimal pixel labelings.

4. The method of claim 3, further comprising defining the data costs in terms of signal-to-noise ratio (SNR) weightings and pixel probabilities for pixels from the input image set.

5. The method of claim 3, further comprising defining seam costs associated with pixel neighbor pairs from the input image set.

6. The method of claim 5, further comprising defining the seam costs using radiance values of the pixel neighbor pairs.

7. The method of claim 5, further comprising radiometrically aligning the input image set to cause each of the images in the input image set to be consistently color balanced with one another.

8. The method of claim 7, further comprising:

selecting a reference image from the input image set;

determining a gain for each color channel of the reference image; and adjusting a gain of each color channel for non-reference images in the input image set to match the gain of the corresponding color channel of the reference image.

9. The method of claim 7, further comprising adjusting gains for a certain color channel of each image in the input image set to make the gains as similar as possible.

10. A computer-readable medium having computer-executable instructions for performing the method recited in claim 1.

11. A computer-implemented process for generating a panoramic high-dynamic range (HDR) image, comprising:

an input step for obtaining an input image set containing a plurality of images capturing different exposure levels and at least partial spatial overlap of a scene;

a reference panorama step for combining at least some of the plurality of images in the input image set to generate a reference panorama containing at least a majority of a spatial extent of the scene; and an exposure augmentation step for filling in and augmenting exposure details of the reference panorama using exposure detail available from the input image set to generate the panoramic HDR image.

12. The computer-implemented process as set forth in claim 11, wherein the exposure augmentation step further comprises simultaneously minimizing data costs and seam costs across the panoramic HDR image to determine optimal pixel labelings.

13. The computer-implemented process as set forth in claim 12, further comprising:

defining the data costs in terms of signal-to-noise ratio (SNR) weightings and pixel probabilities for pixels in the input image set; and defining the seam costs associated with pixel neighbor pairs of the input image set using radiance values of the pixel neighbor pairs.

14. The computer-implemented process as set forth in claim 13, further comprising defining the data costs, DC(i), for selecting image i from the input image set as the optimal pixel labelings of the panoramic HRD image at pixel p by the equation:

$$DC(i) = \lambda / W(M_{p,i}) P(L_{p,i}, L_{p,ref})$$

wherein W is the SNR weighting, P is the pixel probabilities, and $\lambda$ is a parameter used to regularize W and P.

15. The computer-implemented process as set forth in claim 13, further comprising defining the seam costs, C, over each neighbor pixel, p', of pixel p at a location (x,y), by the equation:

$$C(p, p', i, j) = \frac{|L_{p,i} - L_{p,j}| + |L_{p',i} - L_{p',j}|}{L_{p,i} + L_{p,j}}$$

wherein L is pixel radiance.

16. The computer-implemented process as set forth in claim 12, further comprising:

selecting a reference image from the input image set and designating the non-selected images from the input image set as non-reference images;

determining a gain for a certain color channel of the reference image;

adjusting each non-reference image's gain of the certain color channel to approximately match the reference image's gain of the certain color channel; and repeating the above steps for each color channel of the reference image.

17. The computer-implemented process as set forth in claim 16, further comprising defining an error term, E, representing an error between a gain of a non-reference image and a desired gain of the reference image of the certain color channel, by the equation:

$$E = \sum_{p \in \text{valid overlap}(1,R)} (L'_{p,1} G_{1R} - L'_{p,R})^2 + \sum_{p \in \text{valid overlap}(1,3)} (L'_{p,1} G_{1R} - L'_{p,3} G_{3R})^2 + \ldots,$$

18. A system for creating a panoramic high-dynamic range (HDR) image containing a full available spatial extent of a scene and a full available exposure range of the scene, comprising:

an input image set containing images capturing the scene at various exposure levels and capturing a spatial extent of the scene, wherein at least some of the images overlap in the spatial domain;

a reference panorama generation module that generates a reference panorama containing a full available spatial extent of the scene using a subset of the input image set; and a pixel labeling module that fills in and augments exposure detail of the reference panorama by simultaneously minimizing data costs and seam costs to obtain optimal pixel labeling for pixels in the input image set and outputs the panoramic HDR image.

19. The system of claim 18, wherein the data costs are simultaneously minimized using a graph-cut optimization technique.

20. The system of claim 18, further comprising a radiometric alignment module that normalizes the input image set by adjusting color channel gains to take into account exposure differences between images in the input image set.

* * * * *